Oct. 30, 1945.　　　　R. L. BARR　　　　2,387,711
BRAKE MECHANISM
Filed July 17, 1943　　　2 Sheets-Sheet 1
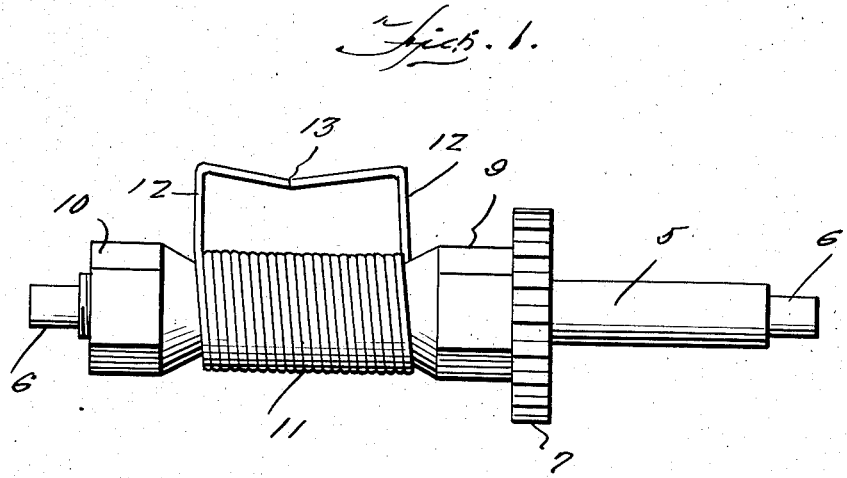
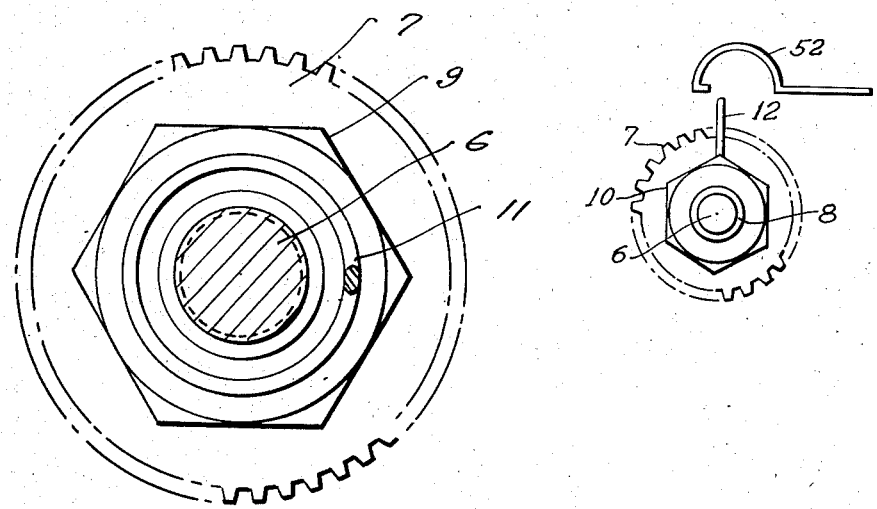
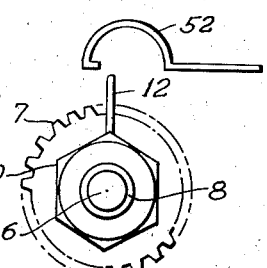
Inventor
Russell L. Barr
By Clarence A. O'Brien
and Harvey B. Jacobson
Attorneys

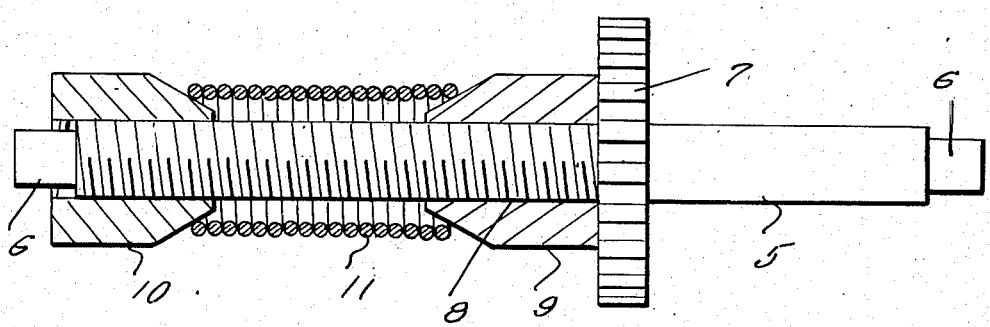
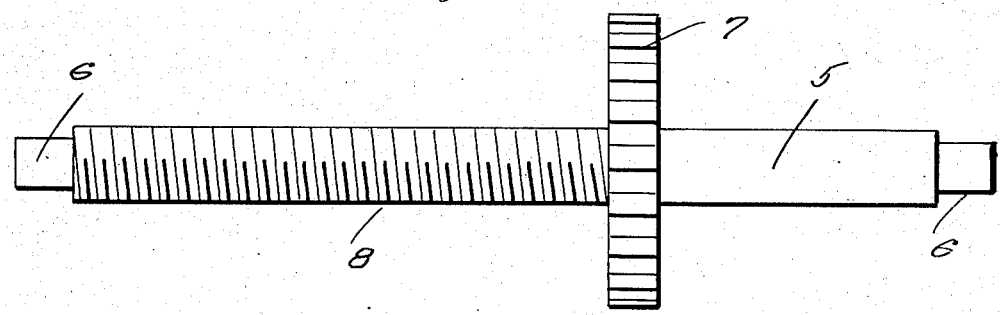

Patented Oct. 30, 1945

2,387,711

UNITED STATES PATENT OFFICE 2,387,711

BRAKE MECHANISM

Russell L. Barr, Elmira, N. Y.

Application July 17, 1943, Serial No. 495,191

3 Claims. (Cl. 188—77)

This invention relates to new and useful improvements in brake mechanisms to control the operation of gear trains so as to effect gradual stopping thereof.

The principal object of the present invention is to provide a simple unit which can be installed in a train of gears to form a brake mechanism having a cushion effect in stopping the operation of the gear train.

Other objects and advantages of the invention will become apparent to the reader of the following description.

In the drawings:

Figure 1 represents a side elevational view of the unit.

Figure 2 is a longitudinal sectional view.

Figure 3 is a cross sectional view.

Figure 4 is a side elevational view showing only the arbor and gear.

Figure 5 is an end elevational view of the unit, together with a brake arm for engaging the resilient loop of the unit.

Referring to the drawings wherein like numerals designate like parts, it can be seen that numeral 5 denotes an elongated arbor having reduced bearing portions 6, 6 at the opposite ends thereof. On the arbor 5 is fixed a gear 7 which will form one gear of a gear train (not shown).

The portion of the arbor 5 extending toward one end from the gear 7 is threaded as at 8 and on this is disposed a pair of cone-shaped nuts 9, 10, the nut 9 being fed inwardly directly against the gear 7. Of course, before the second nut 10 is positioned, the coiled compression spring 11 is interposed between the cone portions of the nuts 9, 10 as in the manner substantially shown in Figure 2. The end portions of the spring 11 are disposed outwardly as at 12, 12 and then inwardly to be joined as at 13 and form a projecting yieldable loop.

The principal function of this device is to allow yielding at the ends of the spring 11 while at the same time having adequate friction between the nuts 9 and 10 and the end convolutions of spring 11 to bring a train of gears in a machine to a smooth stop. The projecting portions 12 of the spring are to be engaged by the reciprocating brake arm or movable part 52 of the machine on which this device is used. This operation prevents any pressure developing where the reciprocating part of the machine engages the projecting part or loop of the spring, after the machine has been brought to a complete stop. This eliminates all possibilities of other reciprocating parts of the machine being thrown out of time with its power gear train. The loop 12, 12 being resilient, stopping of the gear train is cushioned. Rotary adjustment of spring 11 relative to shaft 5 will position loop 12, 12 to be properly engaged by brake arm 52, and by adjusting nut 10 toward nut 9, sufficient friction will be set up between the nuts 9 and 10 and the end convolutions of spring 11 to secure the adjustment of said spring.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A brake mechanism of the character stated, comprising an arbor, a gear fixed on the arbor, a pair of adjustable nuts on the arbor and a coiled compression spring interposed between and frictionally held by the nuts the ends of said spring being extended laterally of the arbor to form a resilient loop engageable by a brake arm.

2. In a gear train, a gear forming part of the train, an arbor for said gear, a pair of nuts adjustable on the arbor, and a coiled compression spring interposed between and frictionally held by the nuts, said spring being provided with a yieldable laterally disposed portion adapted to be engaged by a brake arm.

3. The construction defined in claim 1, wherein the nuts have conical ends entering the ends of the spring.

RUSSELL L. BARR.